(12) United States Patent
Chowdhury et al.

(10) Patent No.: US 7,848,026 B2
(45) Date of Patent: Dec. 7, 2010

(54) CHIRPED METAMATERIALS

(75) Inventors: Aref Chowdhury, Berkeley Heights, NJ (US); Philip Moss Platzman, Short Hills, NJ (US); Lorraine S. Platzman, legal representative, Short Hills, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 12/229,866

(22) Filed: Aug. 27, 2008

(65) Prior Publication Data
US 2010/0053763 A1     Mar. 4, 2010

(51) Int. Cl.
*G02B 3/00*     (2006.01)
*G02B 6/028*    (2006.01)

(52) U.S. Cl. ................................ 359/652; 385/124

(58) Field of Classification Search ............. 359/245, 359/652, 900; 382/123, 124
See application file for complete search history.

(56) References Cited

U.S. PATENT DOCUMENTS

| | | | |
|---|---|---|---|
| 7,015,865 B2 | 3/2006 | Isaacs et al. | 343/757 |
| 2006/0257090 A1 | 11/2006 | Podolskiy et al. | 382/129 |
| 2008/0165442 A1 | 7/2008 | Cai et al. | 359/896 |

OTHER PUBLICATIONS

U.S. Appl. No. 11/432,803, filed May 13, 2006, A. Chowdhury et al.
Anthony J. Hoffman, et al. "Negative Refraction in Mid-Infrared Semiconductor Metamaterials", published online at: http://hoffmananthony.googlepages.com/QELS2006pd_Final.pdf, (in 2005) 2 pages.
Anthony J. Hoffman, et al. "Negative refraction in semiconductor metamaterials", published online: Oct. 14, 2007; *Nature Materials, Advance Online Publications,* www.nature.com/naturematerials, pp. 1-5.
Anthony J. Hoffman, et al. "Negative Refraction in a Semiconductor Metamaterial in the Mid-Infrared", published online at: http://ultralaser.iphy.ac.cn/cleo/data/papers/QWH2.pdf, Quantum Electronics and Laser Science Conference (QELS) (May 2007). 2 pages.
V.G. Veselago, et al. "The left hand of brightness: past, present and future of negative index materials", Nature Materials, vol. 5, Oct. 2006, http://www.nature.com/nmat/journal/v5/n10/pdf/nmat1746.pdf, pp. 759-762.
Costas M. Soukoulis, et al. "Negative Refractive Index at Optical Wavelengths", published online at: http://www.scinecemag.org/cgi/reprint/315/5808/47.pdf. Science, vol. 315, Jan. 5, 2007. pp. 47-49, Erratum.

*Primary Examiner*—Jack Dinh
(74) *Attorney, Agent, or Firm*—John F. McCabe

(57) ABSTRACT

An apparatus includes a medium that is a metamaterial over a frequency range. The medium includes a stack of layers or slabs. A mechanical, electrical, or magnetic property of the layers or slabs of the stack varies monotonically between neighboring ones of the layers or slabs.

17 Claims, 13 Drawing Sheets

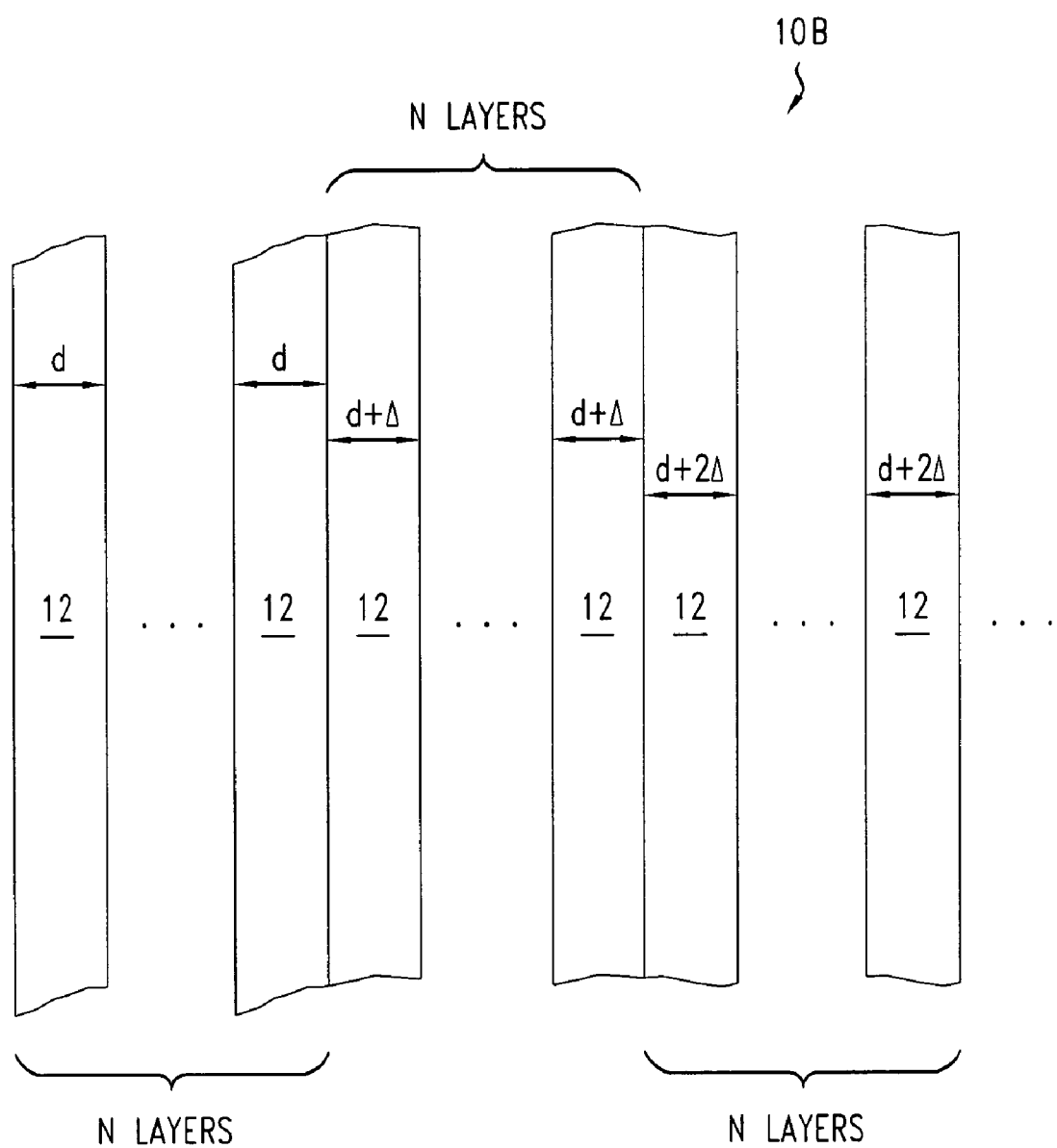

CHIRPED METAMATERIALS

This invention was made with Government support under Contract No. FA9550-06-1-0547 awarded by the Air Force Office of Scientific Research (AFOSR). The Government has certain rights in the invention.

BACKGROUND

1. Field of the Invention

The invention relates generally to metamaterials, methods of fabricating metamaterials, and devices using metamaterials.

2. Discussion of the Related Art

This section introduces aspects that may help facilitate a better understanding of the inventions. Accordingly, the statements of this section are to be read in this light and are not to be understood as admissions about what is prior art or what is not prior art.

Herein, a metamaterial is a three-dimensional (3D) medium whose surface refracts light anomalously such that an incident light ray and a refracted light ray are in the incidence plane and on the same side of the normal to the surface. Some examples of metamaterials have a negative refractive index in a particular frequency range. The negative refractive index causes electromagnetic radiation in the particular frequency range to refract abnormally at surfaces of such media. Other examples of metamaterials have anisotropic media in which the electric permittivity, $\epsilon$, is negative along a first direction and is positive along an orthogonal second direction. Such anisotropic media can also cause anomalous refraction as defined above.

Designs and/or constructions of metamaterials have been proposed for both microwave wavelengths and infrared wavelengths. Such metamaterials are artificial materials with regular artificial structures.

SUMMARY

Various embodiments provide manufactured media that lack invariance under a discrete three-dimensional (3D) translation group. For example, the manufactured media may have a unit cell with a mechanical, electrical, or magnetic property that is smoothly chirped in one spatial direction, or may have a lattice length that is smoothly chirped along one direction. The artificial or manufactured media behave as metamaterials over selected frequency ranges. Due to the chirping of an electrical, magnetic, or mechanical property along one spatial direction, some such artificial media may be able to behave as a metamaterial over a wider frequency range than non-chirped versions of such manufactured media.

One embodiment features an apparatus that includes a medium that is a metamaterial over a frequency range. The medium includes a stack of layers or slabs. A mechanical, electrical, or magnetic property of the layers or slabs of the stack varies monotonically between neighboring ones of the layers or slabs.

In some specific embodiments of the apparatus, the property is a thickness of the layers or slabs or is a spacing between nearest neighboring ones of the slabs.

In some specific embodiments of the apparatus, the property is a magnetic or electrical resonant frequency of individual circuit components of the layers or slabs.

In some specific embodiments of the apparatus, the property is a electric permittivity or magnetic permeability of the layers or slabs.

In some specific embodiments of the apparatus, the stack has an electrical permittivity that has a negative real part along a first direction and has a positive real part along an orthogonal second direction.

In some specific embodiments of the apparatus, the stack includes a stack of bilayers, each bilayer including a conducting sublayer next to a dielectric or semiconducting sublayer.

In some specific embodiments of the apparatus, each layer includes a two-dimensional array of magnetically resonant circuit components and a two dimensional array of electrically resonant circuit elements. In such specific embodiments, the property is a physical dimension of some of said resonant circuit components. In some other such specific embodiments, the magnetically resonant circuit components are split ring resonators, and the property is one of a gap distance of said split ring resonators or a spacing of concentric split rings in the magnetically resonant circuit components. In other such specific embodiments, the resonators include split conducting strip resonators, and the property is one of a gap distance in said split strips and a length of said conducting split wire strips. In some other such specific embodiments of the apparatus, the resonators include split ring resonators, and the property is a spacing distance between co-centric rings of said split ring resonators. In some other such specific embodiments of the apparatus, the resonators include split rings and/or conducting strips, and the property is a resistance of said split rings and/or conducting strips.

One embodiment features a method that includes transmitting a beam of light to a medium that is a metamaterial over a frequency range of the light and outputting a beam of light at a surface of the medium in response to the transmitting. The medium includes a stack of layers or slabs, and a mechanical, electrical, or magnetic property of the layers or slabs is chirped to vary monotonically across the stack.

In some specific embodiments of the method, the transmitted beam of light is selected to approximately resonantly excite circuit components in the layers or slabs. In some such specific embodiments, the circuit components have resonant frequencies that are chirped across the stack.

In some specific embodiments of the method, the stack has an electrical permittivity that has a negative real part along a first direction and has a positive real part along an orthogonal second direction.

BRIEF DESCRIPTION OF THE FIGURES

FIG. 2B is a cross-sectional view of an embodiment of the layered structure of FIG. 1 in which layer slab or thicknesses and/or separations vary from set of adjacent slabs or layers to set of adjacent slabs or layers;

In the FIGS., similar reference numbers refer to features with substantially similar functions and/or structures.

In some of the FIGS., relative dimensions of some features may be exaggerated to more clearly illustrate the structures shown therein.

While the FIGS. and the Detailed Description of Illustrative Embodiments describe some embodiments, the inventions may have other forms and are not limited to those described in the FIGS. and the Detailed Description of Illustrative Embodiments.

DETAILED DESCRIPTION OF ILLUSTRATIVE EMBODIMENTS

Whereas convention metamaterials are manufactured media in which local properties are invariant under the discrete translations of a one-dimensional (1D) or three-dimensional (3D) lattice, various embodiments provide 3D manufactured media in which one or more local properties vary smoothly or smoothly on-the-average along one spatial direction. Various such new 3D manufactured media may be able to behave as metamaterials over a wavelength ranges of microwave radiation, near infrared light, mid-infrared light, or visible light.

Herein, a 3D material with a 1D translation symmetry or an approximate 1D translation symmetry, e.g., approximate due to chirping, may be described as being formed of a stack of slabs or layers. For example, a normal 3D crystalline material is formed of a stack of layers or slabs. Also, any translation symmetry herein may be a translation symmetry that holds for local spatial averages of physical quantities even if the quantities have small local variations in material, e.g., local density variations.

Figure 1:
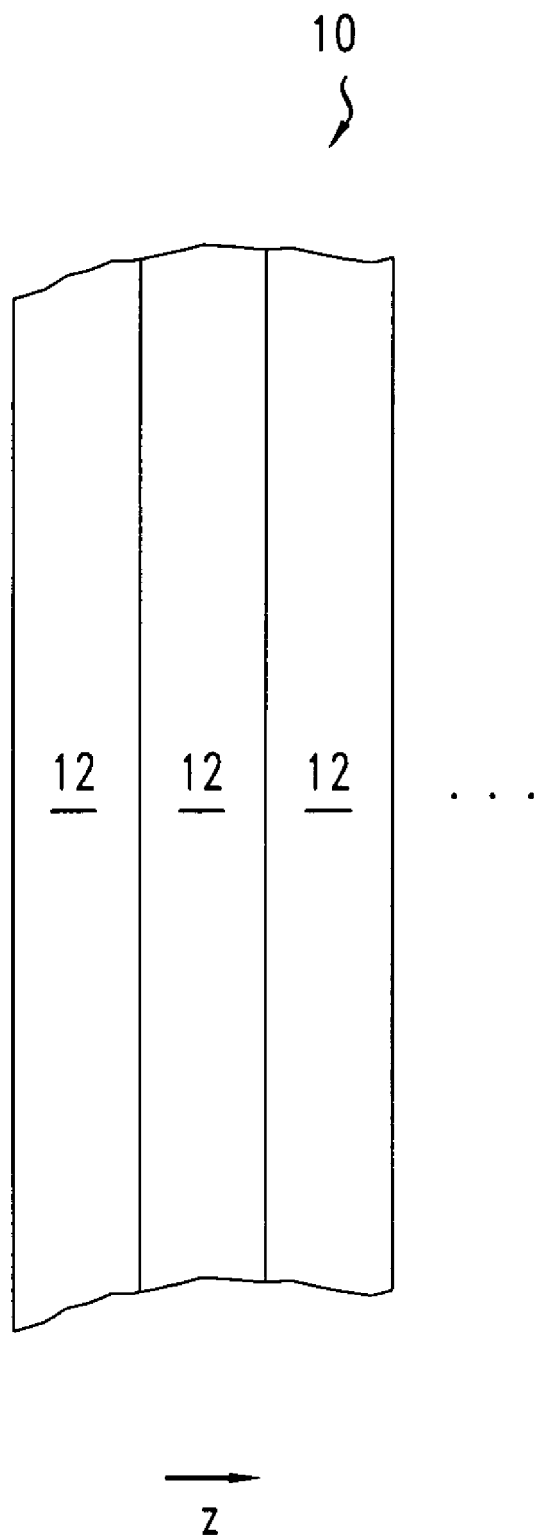
FIG. 1 is a cross-sectional view of an embodiment of a layered structure that behaves as a metamaterial.

FIG. 1 illustrates a manufactured medium 10 that is a metamaterial over a selected portion of one of the above-mentioned wavelength ranges of electromagnetic radiation. The manufactured medium 10 is constructed of a stack of slabs or layers 12, wherein the slabs or layers 12 are stacked along the z-axis. Each of the slabs or layers 12 has a similar structure, but the stack is constructed such that one or more physical properties of the slabs or layers 12 varies smoothly along the z-axis, e.g., perpendicular to the slabs or layers 12. The one of more local physical properties may vary from slab or layer 12 to slab or layer 12 or from nearest neighboring set of slabs or layers to nearest neighboring set of slabs or layers where each nearest neighboring set has two, three, four, or more of the slabs or layers 12. The one or more local physical properties may have a monotonic dependence on distance along the z-axis, e.g., an approximately linear dependence on "z" or an approximately quadratic dependence on "z". That is, the manufactured medium 10 may have a linear chirp or a quadratic chirp, respectively. In other embodiments, the chirping may alternatively have a different dependence on "z".

Figure 2A:
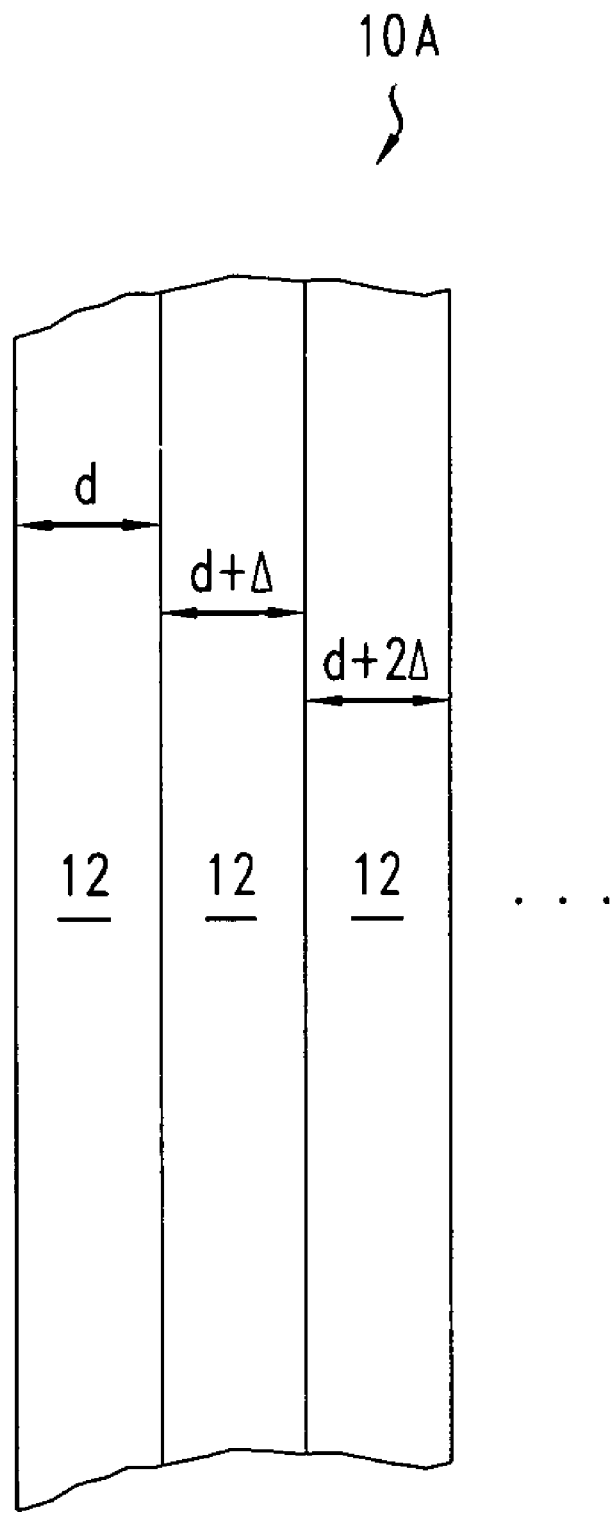
FIG. 2A is a cross-sectional view of an embodiment of the layered structure of FIG. 1 in which slab or layer thicknesses and/or separations vary from slab-to-slab or layer-to-layer.

FIGS. 2A and 2B illustrate specific embodiments 10A, 10B of the manufactured medium 10 of FIG. 1 in which thicknesses and/or spacings of the slabs or layers 12 vary along the z-axis. In the manufactured medium 10A, the thickness and/or the spacing of the nearest neighbor slabs or layers 12 differ by an amount $\Delta(z)$. In the manufactured medium 10B, the thickness and/or spacing of the slabs or layers 12 of nearest neighbor sets of N slabs or layers 12 differ by an amount $A(z)$ where $N>1$. In such embodiments, sets of N adjacent layers or slabs 12 have substantially the same thickness and/or spacing, and the slab/layer thickness and/or spacing jumps by an amount $\Delta(z)$ between adjacent sets of N slabs or layers 12.

Other embodiments of the manufactured media 10a, 10b may be mechanically chirped in a manner depending differently on the perpendicular or stacking coordinate "z", e.g., $\Delta(a+z)^{1/2}$ or $\Delta=f+d\cdot z+h\cdot z^2$. Typically, the thickness or spacing chirping function, $\Delta(z)$, varies monotonically over a range of "z" that is much larger than a wavelength at which the manufactured medium 10A, 10B behaves as a metamaterial. The magnitude of the change of $\Delta(z)$ between adjacent slabs or layers 12 or adjacent sets thereof, i.e., $|\Delta(z)-\Delta(z+x)|$ where "x" is the distance between centers of neighboring slabs or layers or between centers of neighboring sets of slabs or layers with constant properties, is typically small compared to the wavelength at which the manufactured medium 10A, 10B behaves as a metamaterial, e.g., such changes may be 0.2 or less or 0.1 or less of said wavelength. Typically, the thickness or spacing chirping function $\Delta(z)$ is smooth as a function of "z", e.g., having a magnitude that varies by 20% to 0.2% and preferably 5% to 1% over a wavelength at which the manufactured medium 10A, 10B behaves as a metamaterial.

Figure 3:
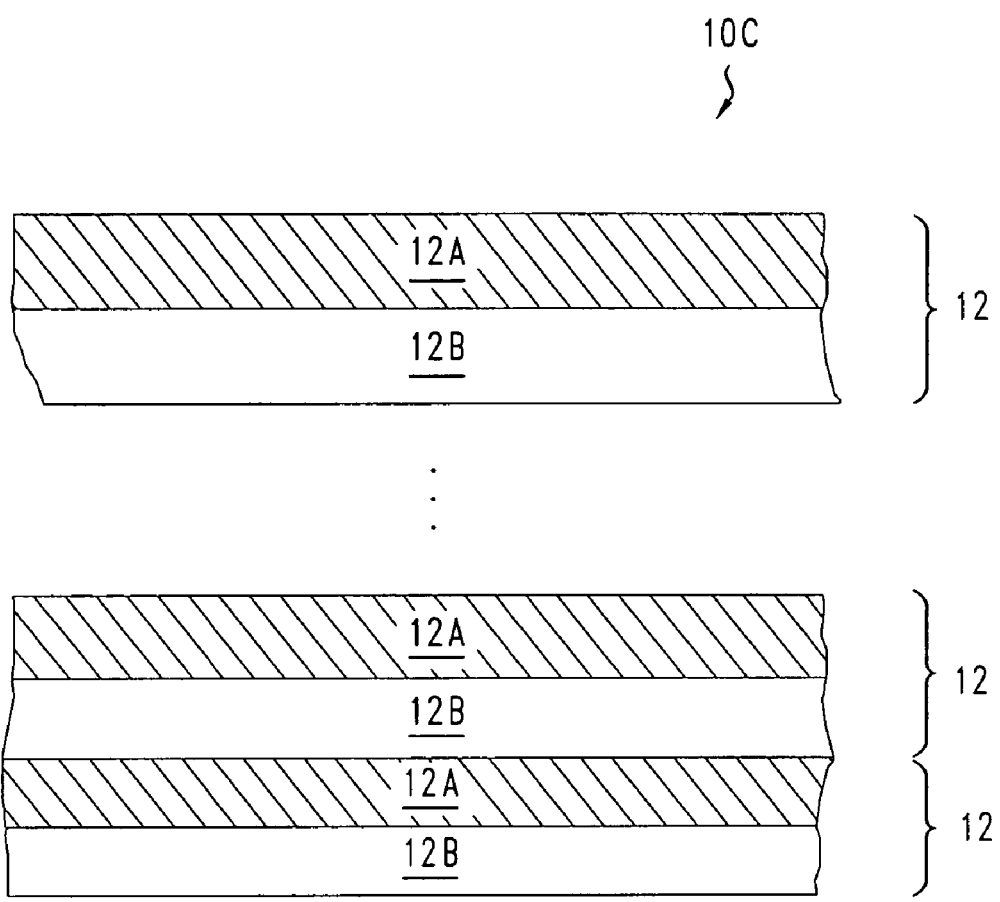
FIG. 3 is a cross-sectional view of an embodiment of the layered structure of FIG. 1 that has a highly anisotropic electric permittivity.

FIG. 3 illustrates some specific embodiments 10C of the manufactured media 10A, 10B shown in FIG. 2A or 2B. The manufactured media 10C have dielectric constants that are highly anisotropic. In particular, the electric permittivity is typically positive along the layers 12 in a selected one of the above-described wavelength ranges and is typically negative perpendicular to layers 12 in the same selected wavelength range. In the selected wavelength range, the manufactured medium 10C may behave as a metamaterial for light, e.g., in transverse magnetic guided modes.

The manufactured medium 10C includes a stack of layers 12, wherein each layer 12 is itself a bilayer that is formed by a conducting sublayer 12a and a dielectric or semiconductor sublayer 12b located on the conducting sublayer 12a. The conducting sublayer 12a is formed of a material having a negative electrical permittivity in the selected wavelength range, and the dielectric or semiconductor sublayer 12b is formed of a material having a positive electrical permittivity n the selected wavelength range.

The artificial material 10C may be constructed of various combinations of materials. Each conducting sublayer 12a may be a conductor such as a metal like silver (Ag), gold (Au), or aluminum (Al), or a heavily doped semiconductor such as gallium-indium-arsenide (n$^+$-GaInAs or p$^+$-GaInAs) or another heavily doped crystalline or polycrystalline semiconductor. Each dielectric or semiconductor sublayer 12b may be a dielectric such as silica glass or silicon nitride or may be an intrinsic (i) or lightly n-type (n) or p-type (p) doped semiconductor such as i, n, or p silicon (Si); i, n, or p gallium-arsenide (GaAs), or i, n, or p aluminum-indium-arsenide (AlInAs).

In one such specific embodiment, the manufactured medium 10C includes a vertical stack of bilayers 12. Each bilayer 12 has an intrinsic (i) Al$_{0.48}$In$_{0.52}$As sublayer 12b and a heavily doped n$^+$-type Al$_{0.48}$In$_{0.52}$As sublayer 12a. The individual sublayers 12a, 12b are grown by a conventional epitaxial growth process, which would be known to persons of skill in the art.

In the stack, the n$^+$-type Al$_{0.48}$In$_{0.52}$As sublayers 12a have dopant concentrations of between about $0.3 \times 10^{19}$ and about $0.75 \times 10^{19}$ n-type dopant atoms per centimeter-cubed.

In the stack, the average thicknesses of the individual sublayers 12a, 12b are, e.g., about 80 nanometers, i.e., averaged over the stack.

In the stack, the sublayers 12a thicknesses vary approximately linearly from one set of N adjacent pairs of sublayers 12a, 12b to the next separate set of N adjacent pairs of sublayers, e.g., changing by an amount Δ for every one, two, three, four, five, or more adjacent pairs of such sublayers 12a, 12b. Across a stack of fifty or more of such pairs of sublayers 12a, 12b, the sublayer thickness may vary, e.g., between about 70 nm and about 90 nm or between about 75 nm and about 85 nm. Thus, for 50 or more pairs of sublayers 12a, 12b, the parameter Δ may be, e.g., as small as about ½ nm and may be as large as about 10 nm depending on whether the thickness is constant in separate sets of N pairs of the sublayers 12a, 12b or varies between adjacent ones of said separate sets of N pairs.

Some such embodiments of the manufactured medium 10C are expected to be metamaterials for light in transverse magnetic guided modes for infrared wavelengths, e.g., wavelengths of about 9 to about 13 micro-meters. The selected wavelength range of the metamaterial behavior is expected to depend on the n-type dopant concentration in the n$^+$-type Al$_{0.48}$In$_{0.52}$As sublayers 12b. The manufactured media 10C may have a refractive index, n, for transverse magnetic guided modes, approximately given by:

$$n = (\epsilon_\perp \cdot v)^{1/2} \operatorname{sign}(v) \text{ where } v = 1 - k^2/(\kappa^2 \cdot \epsilon_\|).$$

where k and κ are the respective wavevector and mode parameter of the transverse magnetic guided mode. Some such embodiments of "mechanically chirped" manufactured media 10C may provide a wider wavelength range over which metamaterial behavior is present than in similar manufactured media without chirping of thicknesses or spacings of the bilayers 12 or adjacent sets of N such bilayers 12.

In other such embodiments of the manufactured medium 10C, the n$^+$-type Al$_{0.48}$In$_{0.52}$As sublayers 12a and/or the Al$_{0.48}$In$_{0.52}$As sublayer 12b may have dopant concentration(s) that vary monotonically across the vertical stack of bilayers 12. In examples, one or both of these dopant concentrations may vary by between 50% and 10% or by between 20% and 5% over a vertical stack of 50-200 such bilayers 12. In some such embodiments, the thicknesses of the bilayers 12 and the sublayers 12a, 12b therein may be approximately constant over the vertical stack. That is, the chirping of one or both dopant concentration(s) may produce a monotonic chirping of one or both sublayer conductivities, i.e., chirping an electric property, without any chirping of mechanical properties such as the layer and sublayer thicknesses.

Examples compositions and/or fabrication techniques that may be useful for making the bilayers 12 of the manufactured media 10C may be described in U.S. patent application publication 2006/0257090 A1 of Viktor A. Podolskiy and Evgueni E. Narimanov (U.S. application Ser. No. 11/434,364, which was filed on May 12, 2006) and/or in "Negative Refraction in Mid-Infrared Semiconductor Metamaterials" by Anthony J. Hoffman, Leonid Alekseyev, Evgenii E. Narimanov, Claire Gmachl, and Deborah Sivco, QWH2.pdf (2007) 2 pages, which is published, e.g., at: http://hoffmananthony.googlepages.com/QELS2006pd_Final.pdf. The above published U.S. patent application and article are incorporated herein by reference in their entirety. These two documents describe selected wavelengths at which above examples of the chirped manufactured medium 10C may be expected to behave as a metamaterial and/or may provide examples of methods of operating apparatus with manufactured optical metamaterials that may be useful for operating devices incorporating the manufactured chirped metamaterials 10C of FIG. 3.

Figure 4:
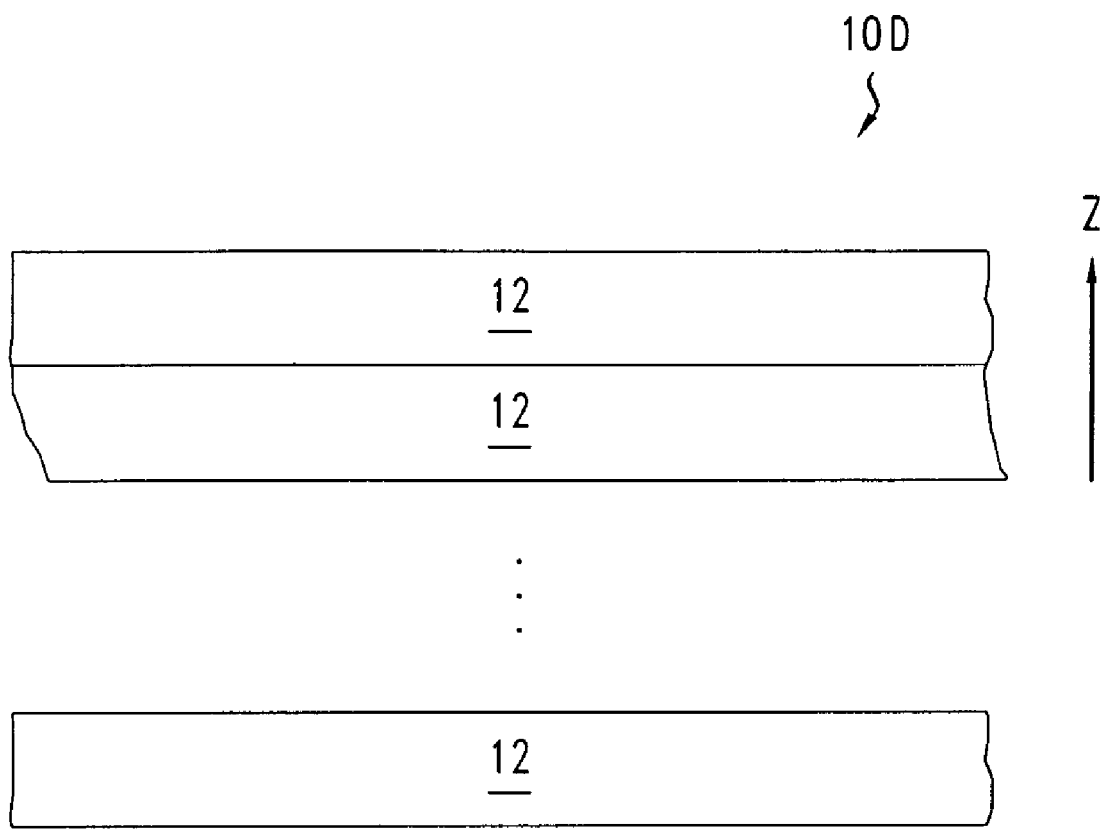
FIG. 4 is a cross-sectional view of an embodiment of the layered structure of FIG. 1 in which the electric permittivity and magnetic permeability have negative real parts in an overlapping frequency range.

FIG. 4 illustrates a different embodiment 10D of the manufactured medium 10 shown in FIG. 1. In the manufactured medium 10D, both the electric permittivity, ε, and magnetic permeability, μ, have negative real parts in a selected frequency range. For that reason, the manufactured medium 10D behaves as a metamaterial in a portion of the selected frequency range. The manufactured medium 10D may behave as a metamaterial, e.g., at microwave wavelengths or at shorter wavelengths.

The manufactured medium 10D is a vertical stack of adjacent slabs 12. In the vertical stack, different ones of the slabs 12 have similar constructions, but one or more physical, electrical, and/or magnetic properties of the individual slabs vary from slab-to-slab or from set of adjacent N slabs 12 to set of adjacent N slabs 12. The varying one or more physical, electrical, and/or magnetic properties may be a dimension of individual resonators, an electric and/or magnetic resonant frequency of such individual resonators spacing(s), a spacing of the slabs 12, and/or a thickness of the slabs 12. That is, the one or more physical, electrical, and/or magnetic properties are chirped along the z-axis of stacking in the manufactured medium 10D of FIG. 4.

Figure 5:
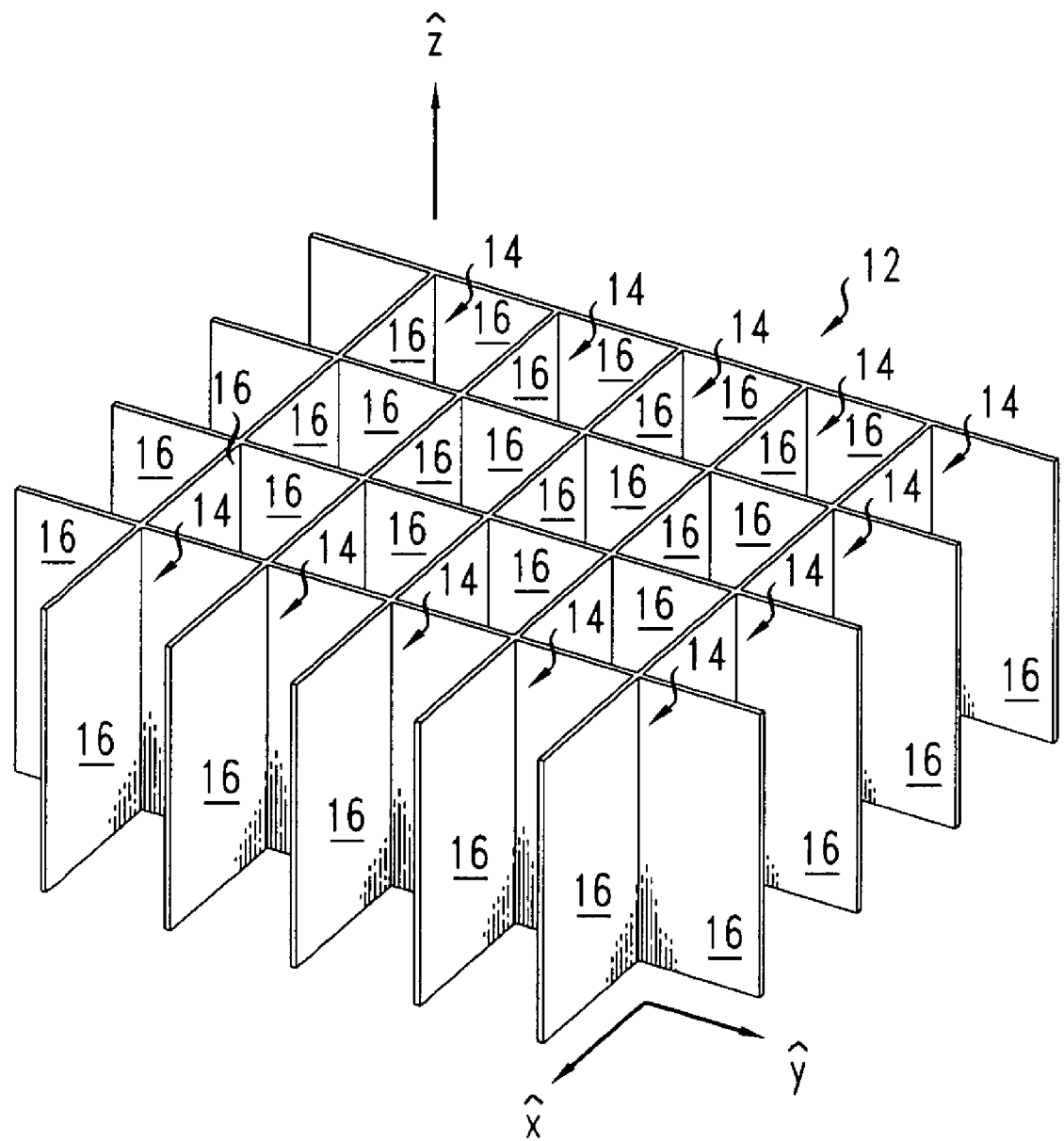
FIG. 5 is an oblique view of one slab of an embodiment of the layered structure of FIG. 4 that includes a two-dimensional (2D) lattice of magnetically and electrically resonant circuit elements.

FIG. 5 is an oblique view towards a face of one slab 12 of the manufactured medium 10D illustrated in FIG. 4. The slab 12 is a substantially regular 2D lattice of unit cells 14. Each of the illustrated unit cell 14 has two adjacent dielectric boards 16, e.g., fiberglass boards. The 2D regular lattice may be formed, e.g., as an interlocking grid of the dielectric boards 16. While the illustrated slab 12 forms a substantially regular 2D square lattice, other embodiments of the slabs 12 may form other regular 2D lattices, e.g., lattices with rectangular, hexagonal, or triangular 2D unit cells. In some embodiments, the 2D lattice of each slab 12 may also be chirped.

Figure 6:
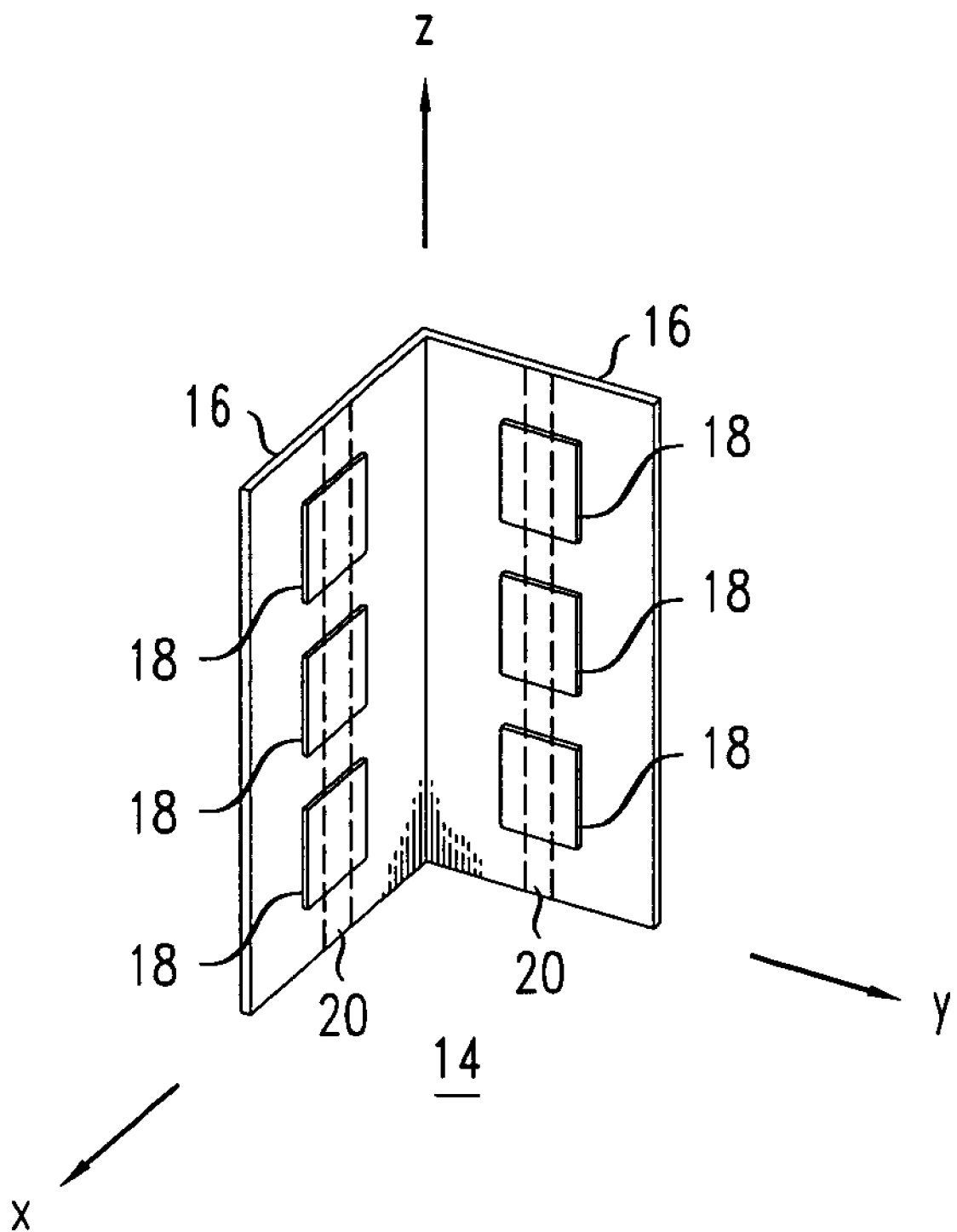
FIG. 6 is an oblique view of a unit cell in the 2D lattice of FIG. 5 in which the resonant circuit elements are split-ring magnetic resonators and split-wire electrical resonators.
Figure 7:
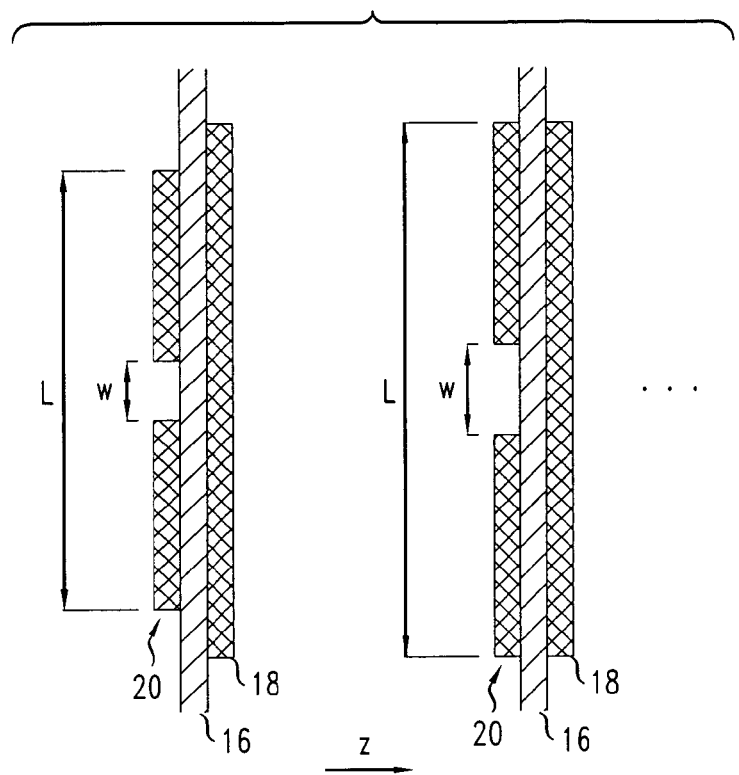
FIG. 7 is a cross-sectional view of neighboring split conducting strips (SCSs) and split ring resonators (SRRs) in one embodiment of the layered structure of FIGS. 4-6 that illustrates one form of component, linear-dimension chirping.

Referring to FIGS. 6-7, each dielectric boards 16 of a unit cell 14 has one or more circuit components 18. Some such circuit components 18 have a resonant magnetic response in a frequency range, and other such circuit components 20 have a resonant electric response in an overlapping frequency range. For convenience, the magnetically resonant circuit component(s) 18 may be located on one face of a dielectric board 16, and the electrically resonant circuit component(s) 20 may be located on the opposite face of the same dielectric board 16 as illustrated in FIGS. 6-7. While the illustrated dielectric circuit boards 16 have three magnetically resonant circuit component 18 and one electrically resonant circuit component, the dielectric boards 16 may have other numbers of said resonant circuit components 18, 20 and/or may have different placements of said resonant circuit components 18, 20 thereon. For example, both types of resonant circuit component may be located on the same face of an individual dielectric board 16.

Figure 8:
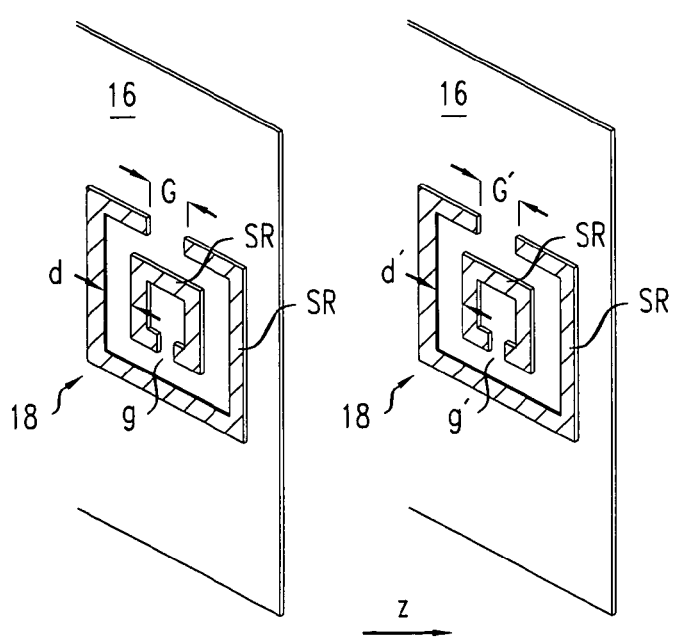
FIG. 8 is an oblique view of neighboring SRRs in one embodiment of the layered structure of FIGS. 4-7, which illustrates one form of component, linear-dimension chirping.
Figure 9:
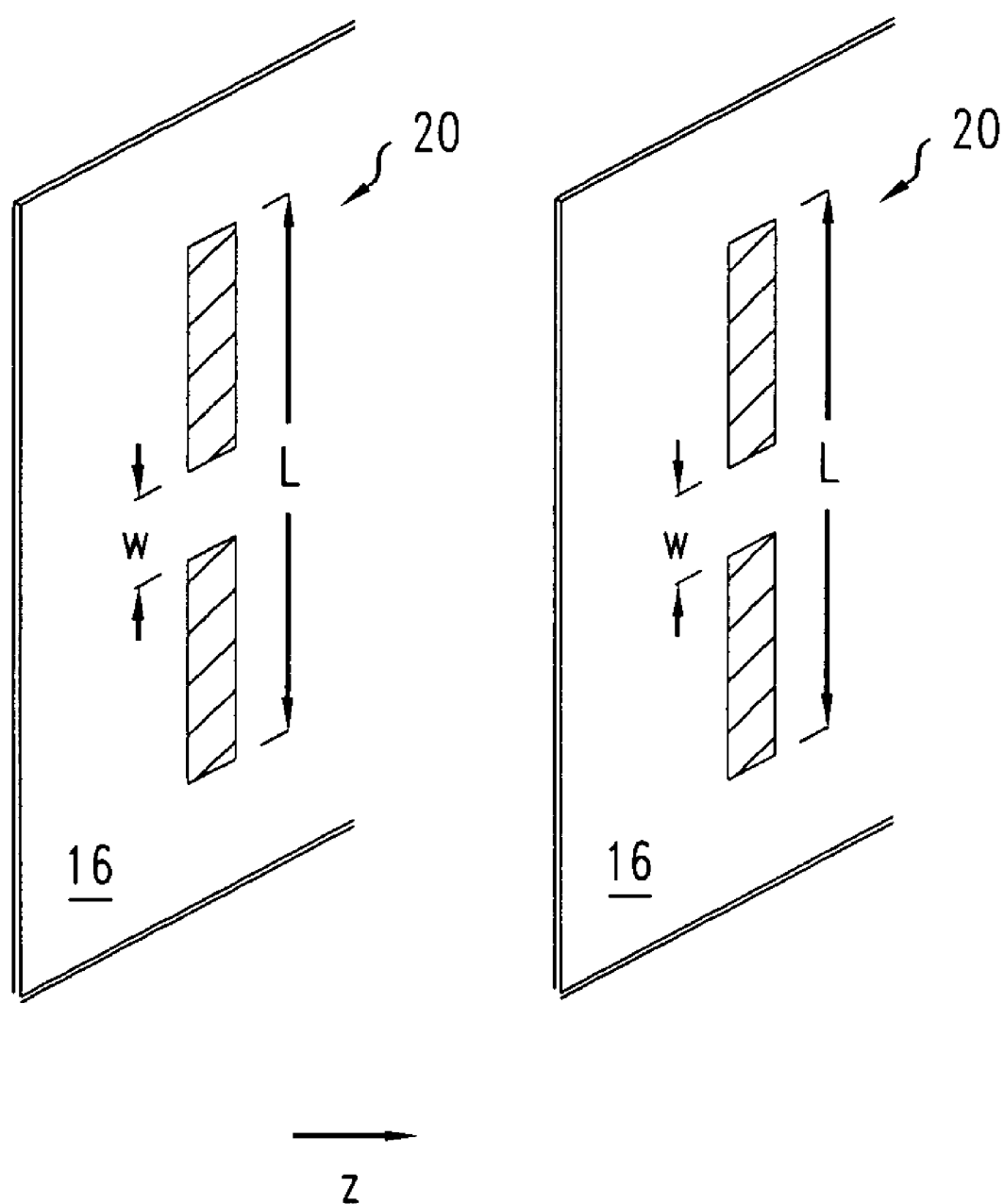
FIG. 9 is an oblique view of neighboring SCSs in one embodiment of the layered structure of FIGS. 4-8, which illustrates one form of component, linear-dimension chirping.

FIGS. 8 and 9 illustrate embodiments of the magnetically resonant circuit components 18 and the electrically resonant circuit components 20, respectively. The illustrated magnetically resonant circuit components 18 are split-ring resonators (SRRs). Each SRR includes a concentric pair of conducting split rings (SRs). In each concentric pair, the SRs are separated by an average distance d. Each SR has a non-conducting gap g, G. The illustrated electrically resonant circuit components 20 are split conducting strips (SCSs). Each SCS has a length L and has a non-conducting gap of width w. The SRs of the SRRs and the SCSs may be formed of patterned metal layers or patterned heavily doped semiconductor layers.

In an exemplary embodiment of the manufactured medium 10D according to FIGS. 4-9, the unit cells 14 form a regular 2D square lattice. The dielectric boards 16 are fiberglass and have a thickness of about 0.25 millimeters (mm), a length along the stack of about 10 mm, and a width perpendicular to the stack of about 5 mm. Each dielectric board 16 has three SRRs 18 along a centerline of one side thereof and has one SCS 20 along the same centerline of the opposite side thereof. The SCSs 20 are formed of copper layers having average thicknesses of about 0.03 mm, average lengths of about 10 mm, and average widths of 0.25 mm. The SRs of the SRRs 18 are also formed of copper layers with average thicknesses of 0.03 mm and average widths of about 0.25 mm. The SRs of SRRs 18 are concentric squares, and the outer square SRs have average side lengths of about 2.62 mm. The average spacing between SRs of a concentric pair is about 0.30 mm. In the SRs of the SRRs 18 and SCSs 20, the widths of the non-conducting gaps g, G and the gap width w may have average values of about 0.46 mm. For the above-described average dimensions, the manufactured medium 10D is expected to behave as a metamaterial in a microwave frequency range.

In the previous paragraph, the various average dimensions refer to averages of the dimensions over the slabs 12 of the vertical stack forming the manufactured media 10D. One or more of said mechanical dimensions may be chirped in various embodiments of the manufactured medium 10D. The chirping of such dimensions may be selected to chirp a frequency of the resonant response of one or both of the electrically and magnetically resonant circuit components 20, 18 and/or may be selected to chirp the frequency width of the resonant response of one or both of said circuit components 18, 20.

In some embodiments, the resistances of one or both of the conducting strips of the magnetically and electrically resonant circuit components 18, 20 may be linearly or quadratically chirped along the stacking direction "z". For example, in a vertical stack of between 50 and 200 such slabs 12, such electrical chirping may be selected to cause, e.g., said resistances to vary by 10% to 50% or by 5% to 20%. Said resistance chirping may cause a chirping of the resonant frequency response curves of the individual resonant circuit components 18, 20. The resistance chirping may be produced by chirping the widths and/or thicknesses of the SRs of the SRRs and/or the SCSs.

In some embodiments, resonant frequencies of the resonant circuit elements 18 and/or 20 may be linearly or quadratically chirped along the stacking direction "z". Over an exemplary vertical stack of between 50 and 200 such slabs 12, such chirping may cause, e.g., said resonant frequencies to vary by 1% to 20% or by 2% to 10%. The chirping of resonant frequencies may be achieved, e.g., by chirping of widths of non-conducting gaps in said SCSs 20 and/or said SRs of SRRs 18. The frequency chirping may be produced by chirping side lengths of the SRs of the SRRs 18, the spacings between concentric SRs of the SRRs 18, and/or the lengths of the SCSs. Over a vertical stack of 50 to 200 slabs 12 such chirping of such linear mechanical dimensions of the resonant circuit elements 18, 20 may be, e.g., in any of the ranges [1%, 20%], [2%, 10%], or [1%, 5%].

In embodiments of the manufactured medium 10D, the chirped linear dimension(s) of individual resonant circuit components 18, 20 may be monotonically chirped, e.g., in the vertical direction of stacking of the slabs 12, i.e., along the z-axis. The chirping may be, e.g., approximately linear or quadratic in the linear dimension(s) and/or about linear or about quadratic in the resonant frequency and/or frequency width of the resonant response of the resonant circuit components 18, 20.

In other embodiments of the manufactured media 10, 10A, 10B, 10C, 10D, the chirping may be along a direction different than the vertical stacking direction of the layers or slabs 12 and/or may be along two orthogonal directions. For example, the lattice spacing may vary substantially linearly along a direction that is in the plane of the slabs or layers 12.

Materials useful for making the slabs 12 and resonant circuit components 18, 20 therein of the manufactured medium of FIGS. 4-9 may be described in U.S. Pat. No. 7,015,865. This U.S. patent is incorporated herein by reference in its entirety.

Figure 10:
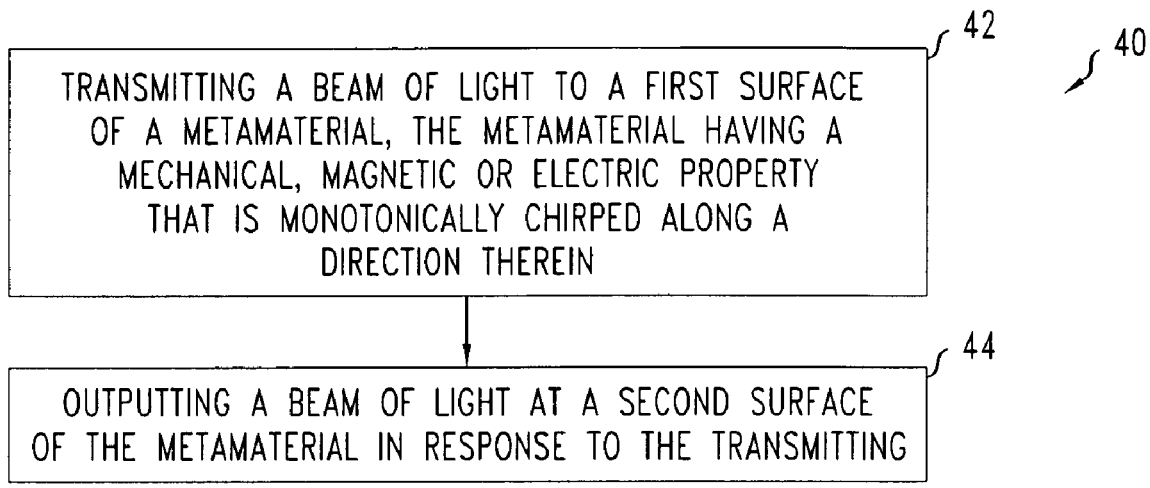
FIG. 10 is a flow chart illustrating a method of operating a device having a chirped metamaterial medium therein, e.g., one of the media of FIGS. 1-9.
Figure 11A:
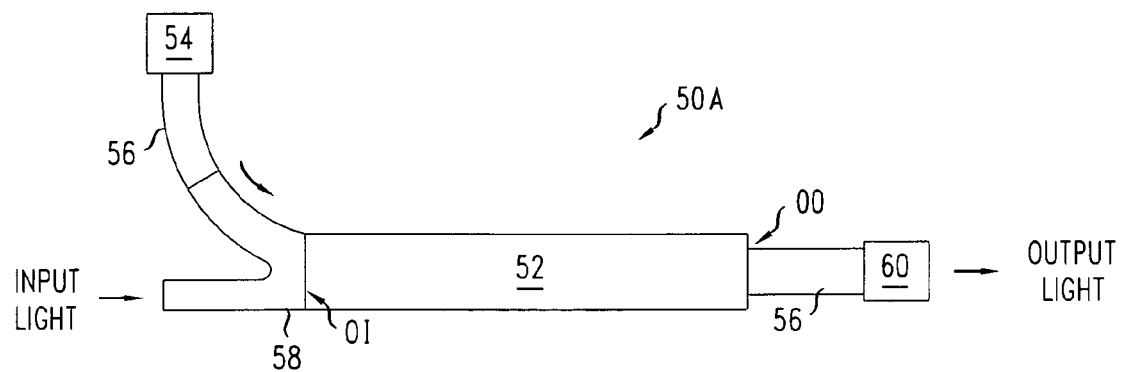
FIGS. 11A-11D are block diagrams illustrating various wavelength converters that include chirped metamaterials, e.g., chirped metamaterials of FIGS. 1-4.
Figure 11B:
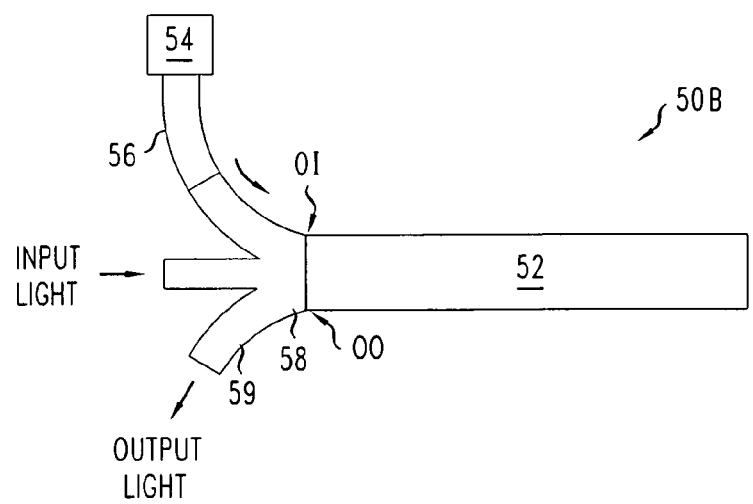
Figure 11C:
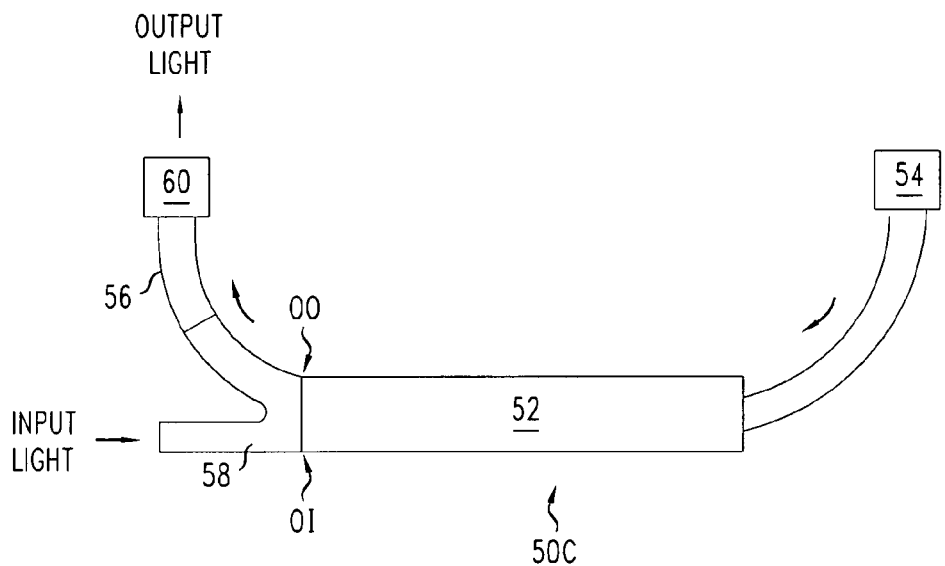
Figure 11D:
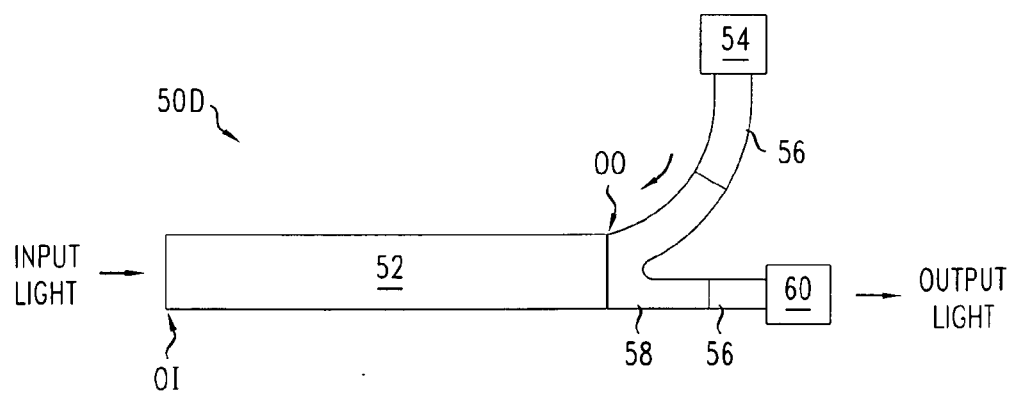

FIG. 10 illustrates a method 40 for operating an optical device that incorporates a medium that is a chirped metamaterial, e.g., any of the manufactured media 10, 10A-10D as illustrated by FIGS. 1-9. The medium includes a stack of layers or slabs, and a mechanical or electrical or magnetic property of the layers or slabs is monotonically chirped along one direction in the medium. For example, the chirping may be along the stacking direction of the layers or slabs and/or perpendicular to said stacking direction.

The method 40 includes transmitting a first beam of light to a first surface of the medium, wherein the medium is a metamaterial at the frequency of the light (step 42). The first beam of light may be, e.g., a beam of visible, infrared, or microwave light.

The method 40 includes outputting a second beam of light from a second surface of the medium in response to the transmission of the first beam of light to the medium at step 42 (step 44). That is, the second beam is produced by the transmission of the first beam to the medium. The light of the second beam may have a different wavelength than light of the first beam, i.e., due to wavelength conversion in the chirped metamaterial medium, or may have the same wavelength as the light of the first beam, e.g., when the medium functions as a refractive optical device.

In the method 40, the transmitted beam of light may be configured to resonantly excite circuit components in layers or slabs of the medium. For example, each slab of the medium may include circuit components having resonant frequencies that are chirped across the stack such that the wavelength of the light is within the full width at have maximum magnitude of the resonant response curves of said circuit components.

FIGS. 11A, 11B, 11C, and 11D illustrate examples of wavelength converters 50A, 50B, 50C, 50D that can include chirped metamaterials, e.g., chirped metamaterials 10, 10A, 10B and/or 10C as illustrated in FIGS. 1-3. In the optical wavelength-converters 50A-50D, the optical conversion medium or waveguide 52 produces wavelength-conversions via a nonlinear optical process involving three photons. The optical wavelength-converters 50A-50D differ in relative directions of input light, pump light and/or wavelength-converted light in their optical conversion media 52.

The optical wavelength-converters 50A-50D includes an optical conversion medium or waveguide 52, an optical pump source 54, one or more ordinary optical waveguides 56, a 2×1 or 3×1 optical coupler 58, and optionally an optical filter 50.

The optical conversion medium or waveguide 52 is formed of a chirped metamaterial, e.g., for light of a frequency of the light to be wavelength-converted, the pump light, and/or the wavelength-converted light. The optical conversion medium or waveguide 52 may function, e.g., as a metamaterial for infrared or visible light. The optical conversion medium or waveguide 52 has an optical input (OI) for receiving the light to be wavelength converted and an optical output (OO) for sending out the wavelength-converted light. The optical conversion medium or waveguide 52 may be formed of a metamaterial that is chirped, e.g., along a light propagation direction therein or along another direction. Examples of the chirped metamaterial may include, e.g., one of the chirped metamaterials 10, 10A, 10B, 10C as illustrated by FIGS. 1-3. The optical conversion medium or waveguide 52 may be in an optical waveguide, e.g., may be in the optical core and/or the optical cladding of a planar optical waveguide. Alternatively, the optical conversion medium or waveguide 52 may simply be an optical medium having port(s) for inputting collimated beams of the pump light and the light to be wavelength-converted therein and having a port for outputting a beam of the wavelength-converted light there from. The various light beams propagate collinearly or anti-collinearly in such an optical conversion medium or waveguide 52.

The optical wavelength-converters 50A and 50D have optical input, OI, and output, OO, at or near opposite ends of the optical conversion medium or waveguide 52. In the optical wavelength-converter 50A, the input, pump, and wavelength-converted light co-propagate in the optical conversion medium or waveguide 52. In the optical wavelength-converter 50D, the input and wavelength-converted light co-propagate in the optical conversion medium or waveguide 52, and the pump light counter propagates with respect to the input and pump light in the optical conversion medium or waveguide 52.

The optical wavelength-converters 50B and 50C have their optical input, OI, and optical output, OO, at or near the same end of the optical conversion medium or waveguide 52. In the optical wavelength-converter 50B, the input and pump light co-propagate in the optical conversion medium or waveguide 52, and the wavelength-converted light counter-propagates with respect to the input and pump light in the optical conversion medium or waveguide 52. In the optical wavelength-converter 50C, the pump and wavelength-converted light co-propagate in the optical conversion medium or waveguide 52, and the input light counter-propagates with respect to the wavelength-converted and pump light in the optical conversion medium or waveguide 52.

The optical pump source 54 produces pump light that is capable of causing a wavelength-conversion of the input light via a nonlinear optical process in the chirped optical conversion medium or waveguide 52. Exemplary optical pump sources 54 may include lasers at wavelengths of near-infrared light or visible light.

In the wavelength-converters 50A-50B, the 2×1 and 3×1 optical couplers 58 have one optical port that functions as an optical input for the light to be wavelength-converted and another optical port that functions as an optical input for the pump light. An optical waveguide 56 such as a silica glass optical fiber or a planar optical waveguide delivers the pump light to the 2×1 or 3×1 optical coupler 58. The 2×1 and 3×1 optical couplers 58 also deliver the received input and pump light to a third optical port. The third optical port connects to the optical input, OI, of the optical conversion medium or waveguide 52. Exemplary 2×1 and 3×1 optical connectors 58 may be fabricated as planar integrated devices or as optical fiber devices by methods well known to those of skill in the art.

In the wavelength-converter 50A, an ordinary optical waveguide 56 connects to the optical filter 60 and receives light from the optical output, OO, of the optical conversion medium or waveguide 52.

In the wavelength-converter 50B, the optical conversion medium or waveguide 52 transmits the wavelength-converted light to the 3×1 optical coupler 58. Some of the wavelength-converted light is then, output at the fourth optical port 59 of the 3×1 optical coupler 58.

In the wavelength-converter 50C, the 2×1 optical coupler 58 has a first optical port that receives input light for wavelength-conversion and has a second optical input that transmits part or all of the received input light to the optical conversion medium or waveguide 52 connected to the second optical port. A third optical port of the 2×1 optical coupler 58 also transmits wavelength-converted light and pump light from the optical conversion medium or optical waveguide 52 and outputs part or all of said received light to an ordinary optical waveguide 56 that connects to the optical filter 60.

In the wavelength-converter 50D, the 2×1 optical coupler 58 has a first optical port that receives input and wavelength-converted light from the optical conversion medium or waveguide 52 and outputs all or part of said received light to a second optical port. The second optical port is connected to the optical filter 60 via an ordinary optical waveguide 56. Here, the optical filter 60 may significantly attenuate light at the input wavelength and transmits light at the converted-wavelength so that the optical wavelength-converter 50D substantially only outputs light at the converted-wavelength. The 2×1 optical coupler also includes a third optical port that receives light from the pump source 54 via a silica glass, planar or fiber optical waveguide 56 and inputs all or part of the received pump light to the optical conversion medium or waveguide 52.

In various embodiments, exemplary M×N optical couplers 58 may be fabricated as planar integrated devices, optical fiber devices, or optical circulator-based devices by methods well known to those of skill in the art.

In embodiments including the optional optical filter 60, the optical filter 60 may significantly attenuate light at the pump wavelength and/or the input wavelength so that the wavelength-converters 50A, 50C, 50D substantially output light only at the converted-wavelength. Exemplary optical filters 50 include band pass, low pass, and/or high pass optical filters whose construction would be readily understood to those of skill in the art.

Figure 12A:
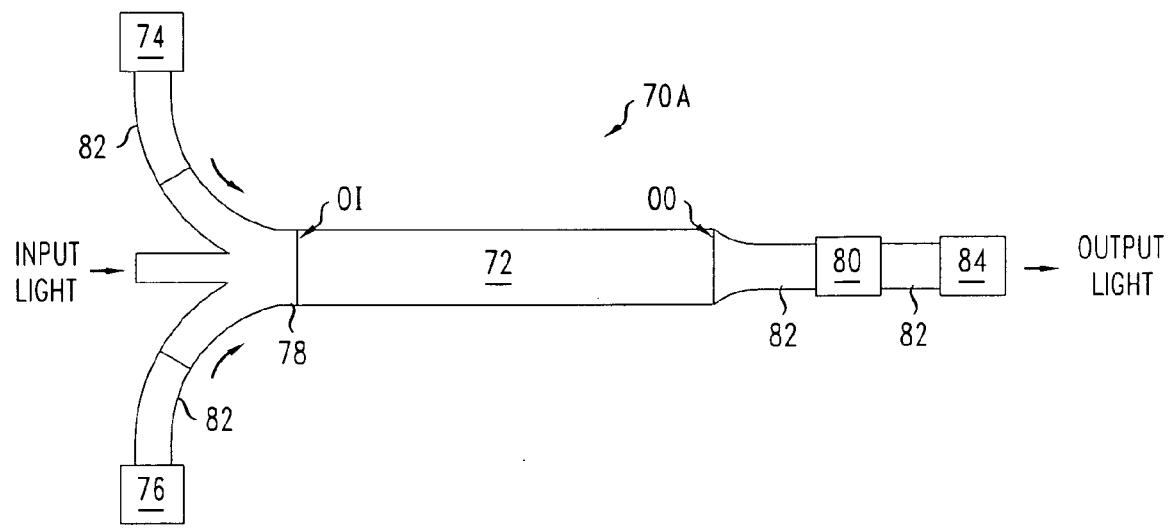
FIGS. 12A-12B are block diagrams for embodiments of apparatus for partially correcting cumulative dispersion and/or cumulative non-linear optical signal distortions that incorporate chirped metamaterials, e.g., the chirped metamaterials of FIGS. 1-4.
Figure 12B:
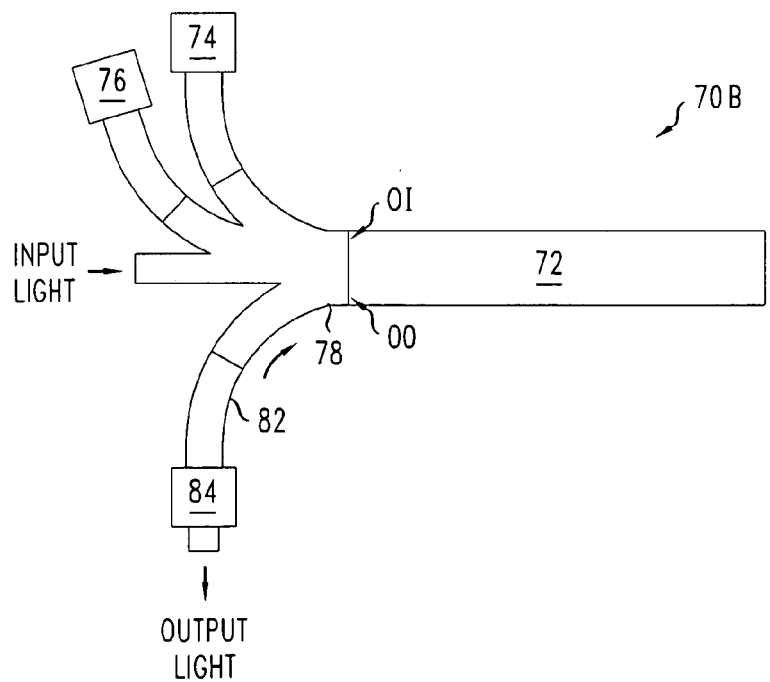

FIGS. 12A and 12B illustrate apparatus 70A and 70B capable of partially correcting the dispersion of optical signals of a data stream and/or partially correcting the distortions of the optical signals that cumulate due to nonlinear optical effects as the optical signals pass through an optical fiber transmission line.

The apparatus 70A and 70B include an optical correction medium or waveguide 72 and a first optical pump 74, a 3×1 or 4×1 optical coupler 78, an optical filter 80, and may include a second optical pump source 76, optical waveguide(s) 82, and an optical wavelength-converter 84.

The 3×1 and 4×1 optical couplers 78 are configured to receive the input data stream of optical signals on a first port and receive pump light from the first and second optical pump sources 74, 76 on second and third ports. The optical coupler 78 delivers light received on the first, second, and third ports to the fourth port, which is connected to the optical correction waveguide 72.

The 4×1 optical coupler 78 of the apparatus 70B outputs light, which is received via the fourth port from the optical correction medium or optical waveguide 72, to a fifth port. The fifth port outputs a partially dispersion and/or distortion corrected data stream of optical signals and may connect via the shown optical waveguide 82 to the optional optical wavelength-converter 84.

The optical correction medium or waveguide 72 includes a chirped metamaterial, e.g., one of the chirped metamaterials 10, 10A, 10B, 10D illustrated by one or more of FIGS. 1-2B and/or 4-9.

The first and second optical pumps 74, 76, e.g., visible or infrared lasers, produce pump light at the selected frequencies $\omega_2$ and $\omega_3$. The frequencies $\omega_2$ and $\omega_3$ are selected to cause the optical correction medium or waveguide 72 to partially correct cumulative dispersion and/or nonlinear effects of an optical data stream with carrier frequency $\omega_1$.

In the apparatus 70A, the optional optical filter 80 filters out light at the first and second pump frequencies and may also filter out light at the input frequency when $\omega_1 \neq \omega_4$.

The optional optical wavelength-converter 84 wavelength-converts the light of corrected data stream of optical signals. For example, optical wavelength-converter 84 may be used to wavelength-convert light of the corrected data stream back to the input frequency $\omega_1$ of the data stream originally received by the apparatus 70A and 70B. The optical wavelength-converter may include one of the above-described wavelength-converters or a conventional optical wavelength-converter.

In the apparatus 70A-70B, the nonlinear optical medium of the optical correction medium or waveguide 72 has a negative third-order nonlinear electrical susceptibility, $\chi^{(3)}$, for a relevant set of frequency arguments. For example, $\chi^{(3)}(\omega_4, \omega_1, \omega_2, \omega_3)$ may be negative in the nonlinear optical medium where $\omega_1$ is the frequency of input light, $\omega_2$ and $\omega_3$ are the frequencies of the pump light, and $\omega_4$ of the light in the corrected optical data stream. The nonlinear optical medium is also a chirped metamaterial at one or more of the frequencies $\omega_1, \omega_2, \omega_3,$ and $\omega_4$.

Methods for fabricating and operating optical wavelength converters and/or optical apparatus for correcting cumulative dispersion and/or distortions from nonlinear optical effect are described, e.g., in U.S. patent application Ser. No. 11/432,803, filed May 13, 2006, by Aref Chowdhury et al ('803 application), which is incorporated by reference herein in its entirety. The chirped metamaterials described herein may be used to replace metamaterials of the wavelength converters and/or apparatus for correcting cumulative dispersion and/or distortions of the '803 application, e.g., to potentially improve the performance and/or bandwidth of said devices.

The various chirped metamaterials described herein may be incorporated into other apparatus. For example some such apparatus may be able to cloak objects from detection by microwave radiation beams. Some metamaterial-based apparatus for performing such cloaking are described, e.g., in U.S. Patent Application Publication No. 2008/0165442 (U.S. patent application Ser. No. 11/983,228), which was filed on Nov. 7, 2007 by Wenshan Cai et al. Other examples of such other apparatus are refractive metamaterial-based devices. Some such refractive devices use a medium that has regions that are reconfigurable between being a metamaterial and being an ordinary refractive medium as described, e.g., in U.S. Pat. No. 7,015,865. The above-described chirped metamaterials 10, 10A, 10B, 10D, as illustrated in FIGS. 1-2B and 4-9, and/or reconfigurable variants thereof may be used to replace the metamaterials in such apparatus.

U.S. Pat. No. 7,015,865 and U.S. Patent Application Publication No. 2008/0165442 (i.e., U.S. patent application Ser. No. 11/983,228) are incorporated herein in their entirety.

The invention is intended to include other embodiments that would be obvious to a person of ordinary skill in the art in light of the disclosure of the description, figures, and claims.

What is claimed is:

1. An apparatus, comprising:
   a medium that is a metamaterial over a frequency range; and
   wherein the medium is formed of a stack of layers or slabs; and
   wherein a thickness of the layers or slabs, a spacing between nearest neighboring ones of the layers or slabs, an electrical property of the layers or slabs of the stack, or a magnetic property of the layers or slabs varies monotonically and smoothly between neighboring ones of the layers or slabs of the stack.

2. The apparatus of claim 1, wherein a magnetic or an electrical resonant frequency of individual circuit components of the layers or slabs of the stack varies monotonically and smoothly between neighboring ones of the layers or slabs.

3. The apparatus of claim 1, wherein an electric permittivity or a magnetic permeability varies monotonically and smoothly between neighboring ones of the layers or slabs.

4. The apparatus of claim 1, wherein the stack has an electrical permittivity that has a negative real part along a first direction and has a positive real part along an orthogonal second direction.

5. The apparatus of claim 4, further comprising an optical pump source connected to pump the medium such that the medium wavelength-converts light input therein with a selected frequency.

6. The apparatus of claim 4, further comprising an optical pump source connected to pump the medium such that the medium is able to correct cumulative optical dispersion or a cumulative nonlinear optical distortion of an optical signal stream introduced therein.

7. The method of claim 1, wherein the stack includes a stack of bilayers, each bilayer including a conducting sublayer neighboring a dielectric or semiconducting sublayer.

8. The apparatus of claim 1, wherein each layer includes a two-dimensional array of magnetically resonant circuit components and a two-dimensional array of electrically resonant circuit components; and
   wherein a physical dimension of some of said resonant circuit components varies monotonically and smoothly between neighboring ones of the layers or slabs.

9. The apparatus of claim 8, wherein the magnetically resonant circuit components are split ring resonators, and a gap distance of said split ring resonators or a spacing of concentric split rings in the magnetically resonant circuit components varies monotonically and smoothly between neighboring ones of the layers or slabs.

10. The apparatus of claim 8, wherein the electrically resonant circuit components include split conducting strip resonators, and one of a gap distance between strips of said split conducting strip resonators and a length of said split conducting strip resonators varies monotonically and smoothly between neighboring ones of the layers or slabs.

11. The apparatus of claim 8, wherein the magnetically resonant circuit components include split ring resonators, and a spacing distance between co-centric rings of said split ring resonators varies monotonically and smoothly between neighboring ones of the layers or slabs.

12. The apparatus of claim 8, wherein the resonant circuit components include split rings and/or conducting strips, and a resistance of said split rings and/or conducting strips varies monotonically and smoothly between neighboring ones of the layers or slabs.

13. The apparatus of claim 1, wherein the medium behaves as a metamaterial at an infrared or a visible wavelength of light.

14. A method, comprising:
 transmitting a beam of light to a medium that is a metamaterial over a frequency range of the light; and
 outputting a beam of light at a surface of the medium in response to the transmitting; and
 wherein the medium is formed of a stack of layers or slabs; and
 wherein a thickness of the layers or slabs, a spacing between nearest neighboring ones of the layers or slabs, an electrical property of the layers or slabs, or a magnetic property of the layers or slabs is chirped to vary monotonically and smoothly across the stack.

15. The method of claim 14, wherein the transmitted beam of light is selected to approximately resonantly excite circuit components in the layers or slabs.

16. The method of claim 15, wherein the circuit components have resonant frequencies that are chirped across the stack.

17. The method of claim 14, wherein the stack has an electrical permittivity that has a negative real part along a first direction and has a positive real part along an orthogonal second direction.

\* \* \* \* \*